C. L. TISCH.
TEDDER ATTACHMENT FOR MOWING MACHINES.
APPLICATION FILED FEB. 28, 1911.
1,016,655.
Patented Feb. 6, 1912.
2 SHEETS—SHEET 2.
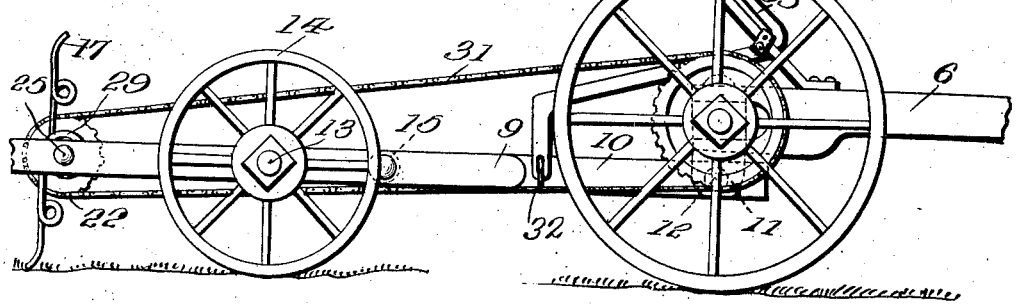
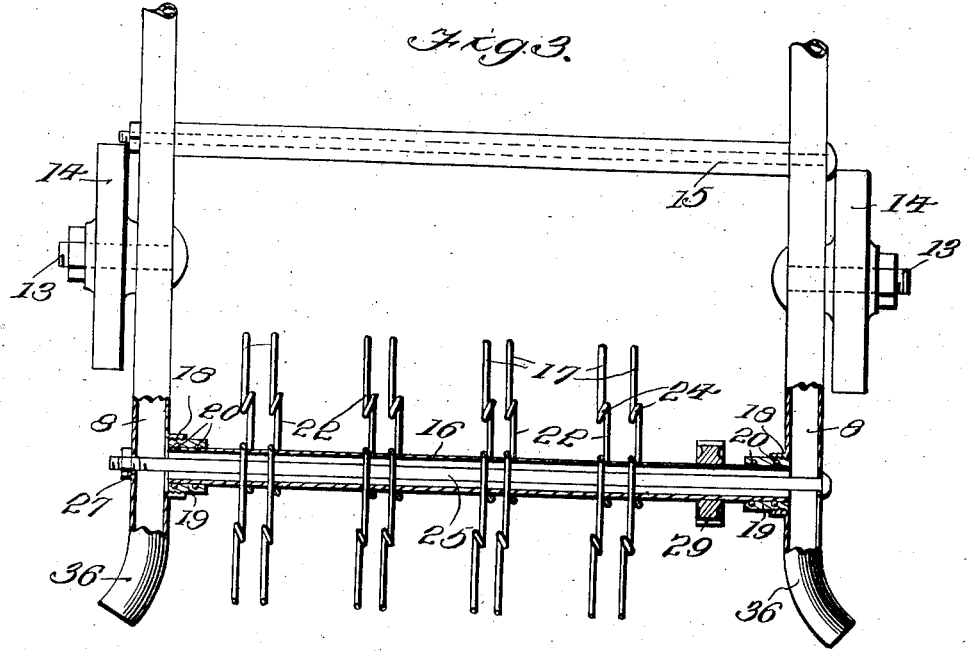
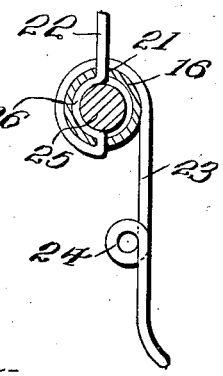
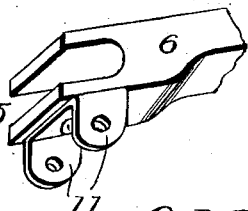
Inventor
C. L. Tisch.
Witnesses
By
Attorneys.

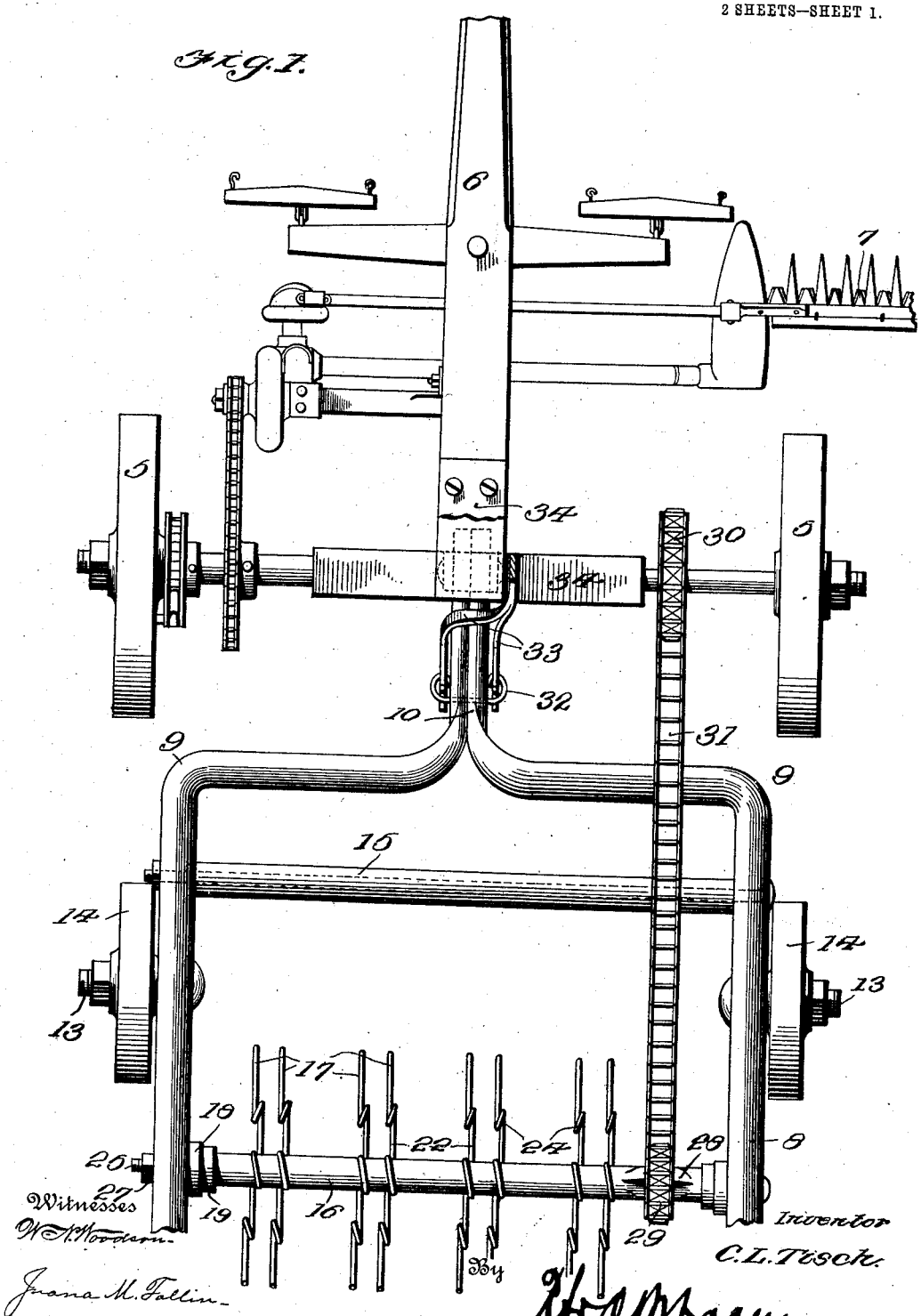

UNITED STATES PATENT OFFICE.

CHARLES L. TISCH, OF BEACH HAVEN, PENNSYLVANIA.

TEDDER ATTACHMENT FOR MOWING-MACHINES.

1,016,655.  Specification of Letters Patent.  Patented Feb. 6, 1912.

Application filed February 28, 1911. Serial No. 611,499.

*To all whom it may concern:*

Be it known that I, CHARLES L. TISCH, a citizen of the United States, residing at Beach Haven, in the county of Luzerne and State of Pennsylvania, have invented certain new and useful Improvements in Tedder Attachments for Mowing-Machines, of which the following is a specification.

This invention relates to hay tedders and has for its object the provision of a comparatively simple and thoroughly efficient device of this character, capable of being readily attached to a mowing machine and by means of which the hay may be stirred and spread to facilitate drying thereof after the mowing machine and draft animals have passed over the same.

A further object is to provide a tedder including a wheeled truck having a transverse shaft mounted for rotation on the rear end thereof and provided with a plurality of spaced yieldable teeth or forks for engagement with the hay or other material, means being provided for transmitting motion from the mowing machine to said shaft.

A further object is to provide improved means for fastening the teeth or forks in position on the transverse shaft of the truck, and means operable from the driver's seat of the mowing machine for raising and lowering the free end of said truck.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a top plan view of a tedder attachment constructed in accordance with my invention, showing the tedder attached to a mowing machine; Fig. 2 is a side elevation; Fig. 3 is a top plan view, partly in section, of a portion of the tedder; Fig. 4 is a vertical sectional view of the revolving shaft, showing the manner of fastening the teeth or forks in position thereon; Fig. 5 is a detail perspective view of the fixed end of the tongue of the mowing machine, showing the construction of the depending ears for attachment to the draft tongue of the tedder.

Corresponding and like parts are referred to in the following description and indicated in all the views of the drawings by the same reference characters.

The improved tedder forming the subject matter of the present invention is principally designed for attachment to mowing machines, and by way of illustration is shown in connection with a mowing machine of the ordinary construction in which 5 designates the ground wheels, 6 the tongue and 7 the cutter bar.

The device comprises a truck including side bars 8 preferably formed of tubing and having their forward ends bent inwardly at 9 and thence extended longitudinally to form parallel arms 10, the latter being disposed in contact with each other and bolted or otherwise rigidly united. The tubing forming the free ends of the arms 10 is preferably flattened and pierced by a transverse recess for the reception of a pivot pin 12, said pin having its opposite ends extended through corresponding openings formed in ears 11 depending from the tongue of the mowing machine, as shown, thus to form a pivotal connection between the tedder and mowing machine and permitting the rear end of the tedder to be raised or lowered without affecting said mowing machine.

Extending laterally from the side bars 8, are stub shafts 13 on which are mounted for rotation suitable ground wheels 14, there being a transverse brace 15 connecting the side bars at the rear of the ground wheels in order to hold the side bars in parallel relation to each other. The side bars 8 are provided with openings for the reception of a tubular shaft 16 to which are secured the tedder teeth or forks 17. The opposite ends of the shaft 16 are seated in suitable openings formed in the side bars 8 of the truck, the walls of said openings being extended laterally to form collars 18 having their interior walls threaded for engagement with correspondingly threaded sleeves 19. The sleeves 19 are provided with anti-friction balls 20, which latter bear against the hollow shaft 16 and serve to prevent undue friction between the parts when the tedder is in operation.

The teeth or forks 17 are each preferably formed of a single length of spring wire having its intermediate portion passed through openings 21 formed in the hollow shaft 16, one end of the wire being extended longitudinally beyond the shaft 16 to form a finger 22, and the other end of the wire being extended partially around the shaft 16 and in contact with the finger 22 to form a similar finger 23. The material forming the fingers 22 and 23 is bent to produce spring coils 24 so as to permit the fingers to yield laterally when striking an obstruction and thus prevent damage thereto.

Extending transversely through the tubular shaft 16, is a locking rod 25, which latter bears against the intermediate portions of the teeth 17 and serves to press the wire forming said teeth laterally in contact with the interior wall of the tubular shaft 16, as indicated at 26, thus to prevent tilting or wabbling movement of the teeth or forks on the shaft and also to assist in maintaining said teeth or forks in proper spaced relation to each other. The opposite ends of the locking rod 25 are extended through suitable openings in the side bars of the truck and engaged by the nut 27.

It will here be noted that the rod 25 not only forms a means for locking the teeth or forks on the tubular shaft 16, but also serves to reinforce and strengthen the latter. One end of the tubular shaft 16 is provided with a squared portion 28 to which is keyed or otherwise secured a sprocket wheel 29, there being a similar sprocket wheel 30 secured to one of the ground wheels 5 of the mowing machine for engagement with a sprocket chain 31 so that as the machine is caused to travel over a field or other inclosure, motion will be transmitted from the mowing machine to the tedder teeth or forks and thus elevate and spread the hay, as will be readily understood.

Extending transversely through the arms 10 of the truck, is a rod having terminal eyes 32 to which is connected the adjacent end of an operating lever 33, the intermediate portion of the lever 33 being pivotally mounted on a bracket or support 34 to which is secured the driver's seat 35, the upper end of said lever being extended to form a handle, so that by tilting the lever on its pivotal axis, the whole rear end of the truck together with the wheels 14 may be elevated above the surface of the ground, when the mowing machine is making a turn.

The free ends of the side bars 8 are preferably deflected laterally at 36, while the terminals of said teeth or forks are also preferably curved or bent laterally to assist in picking up and spreading the hay.

Attention is here called to the fact that the tedder attachment is arranged at the rear of the mowing machine, and to one side of the cutter 7 so that the teeth or forks of the tedder will thoroughly loosen and spread the hay, to facilitate drying thereof, after the mowing machine and draft animals have passed over the same.

If desired, the locking rod 25 may be dispensed with and the tubular member or shaft 16 extended through the side bars of the frame without departing from the spirit of the invention.

The device is extremely simple in construction and may readily be attached to any style of mowing machine now in general use, without changing or otherwise altering the construction thereof.

Having thus described the invention, what is claimed as new is:

1. The combination with a mowing machine, of a wheeled truck including spaced side bars having their forward ends bent inwardly and united to form a draft tongue, a hollow shaft journaled between the side bars at the rear end of the truck, a plurality of spring tedder teeth carried by the hollow shaft, a pivotal connection between the draft tongue and mowing machine, and a lever mounted on said mowing machine and operatively connected with the draft tongue of the truck for elevating the rear end thereof.

2. The combination with a mowing machine, of a wheeled truck pivotally connected with the mowing machine, a hollow shaft journaled on the truck, a plurality of spring teeth extending transversely through the shaft, a locking rod entirely housed within said shaft and bearing against the adjacent portions of the teeth, and a lever connected with the front end of the truck for elevating the rear end thereof.

3. The combination with a mowing machine, of a wheeled truck including spaced side bars having their forward ends bent to produce a draft tongue for pivotal connection with the mowing machine, a hollow shaft journaled between the side bars at the rear end of the truck and provided with spaced openings, spring teeth, each formed of a single piece of wire having its intermediate portion passed through the adjacent openings and its opposite ends extended beyond the hollow shaft, a locking rod housed within the shaft and bearing against the intermediate portion of the wire constituting each tooth for pressing said wire laterally in contact with the interior wall of the hollow shaft, and an operating lever connected with the draft tongue for raising and lowering the rear end of the truck.

4. The combination with a mowing machine, of a wheeled truck pivotally connected with said mowing machine and including spaced side bars, a hollow shaft journaled in said side bars at the rear of the truck and provided with spaced openings, spring teeth mounted on the shaft and each formed of a single length of wire having its intermediate portion passed through the adjacent openings and extended laterally on opposite sides of the shaft, a locking rod extended through the side bars of the truck and having one end thereof threaded and its intermediate portion housed within the hollow shaft and bearing against the intermediate portions of the wire constituting the teeth for forcing the wire in contact with the interior wall of the hollow shaft, and a nut engaging the threaded end of the rod.

5. The combination with a mowing machine, of a wheeled truck pivotally connected with the mowing machine and including spaced side bars having openings formed therein and provided with inwardly extending collars, a hollow shaft journaled in said openings, sleeves engaging the collars and provided with anti-friction balls bearing against the hollow shaft, a plurality of spring teeth carried by the shaft, and a lever operatively connected with the pivoted end of the truck for raising and lowering the free end thereof.

6. The combination with a mowing machine having spaced depending ears, of a wheeled truck including spaced side bars having their forward ends brought together and rigidly united to form a tongue fitting between the ears of the mowing machine, a pivot pin extending through said ears and tongue and forming a pivotal connection between the truck and said mowing machine, a hollow shaft journaled between the side bars at the rear end of the truck, a plurality of spring teeth piercing the hollow shaft and each formed of a single piece of wire having its opposite ends bent to produce spring coils, a bar extending transversely through the tongue and provided with terminal eyes, and a lever operatively connected with the eyes for raising and lowering the rear end of the truck.

7. The combination with a mowing machine, of a wheel truck pivotally connected with the mowing machine and including spaced side bars having their forward ends brought together and rigidly united to produce a draft tongue extending beneath the mowing machine, the inner walls of said side bars at the rear end of the truck being provided with openings constituting bearings, a hollow shaft journaled in said openings, a plurality of spring teeth piercing the hollow shaft and having their opposite ends formed with coils, and a locking rod housed within the hollow shaft and having its opposite ends extended through the openings in the side bars.

In testimony whereof, I affix my signature in presence of two witnesses.

CHARLES L. TISCH. [L. S.]

Witnesses:
JOHN F. WRIGHT,
A. B. MACCREA.

---

Copies of this patent may be obtained for five cents each, by addressing the "Commissioner of Patents. Washington, D. C."